Feb. 13, 1968

F. W. MERRILL 3,368,751

CONTROL APPARATUS

Filed April 18, 1966

*INVENTOR.*
FRED W. MERRIL
BY Charles J. Ungemach
ATTORNEY

Feb. 13, 1968 F. W. MERRILL 3,368,751
CONTROL APPARATUS

Filed April 18, 1966 2 Sheets-Sheet 2

INVENTOR.
FRED W. MERRIL
BY Charles J. Ungemach
ATTORNEY 3,368,751
CONTROL APPARATUS
Fred W. Merrill, Mound, Minn., assignor to Honeywell Inc., Minneapolis, Minn., a corporation of Delaware
Filed Apr. 18, 1966, Ser. No. 543,287
7 Claims. (Cl. 235—201)

ABSTRACT OF THE DISCLOSURE

The disclosure relates to a novel pneumatic indicator and particularly to the shape of the housing itself. In cross section the housing is as a square with three of the four corners removed so as to form an approximation of a circle. A large central chamber is in the housing and a small chamber parallel to the small chamber is located in the remaining square corner. This shape is chosen so as to provide an approximately equal amount of material between the outer periphery of the housing and the large chamber to facilitate the making of the housing by the process of injection molding.

---

The present invention concerns control apparatus and more particularly an improved indicator structure.

In the prior art, indicators and more specifically fluid operated indicators have been known. For example an application, filed Feb. 17, 1966, Ser. No. 528,203, in the name of Neil C. Sher and Warren J. Olsen and assigned to the assignee of the present invention shows an indicator having a square shape, a piston movable between 2 positions under the influence of a fluid force and wherein one of the corners of the square shape provides the space for a bypass fluid port so that no external protuberances are necessary. While the indicator described in the above mentioned co-pending application provides a simple, light weight and easy to manufacture indicator, it has been found that certain problems exist which the present invention overcomes.

It is desirable in order to minimize the cost of producing indicators that they be constructed using a process identified as injection molding. In this process the material of which the indicator housing is made is heated until it is liquid. This liquid material is injected into a suitable mold where it is allowed to freeze. It is thereafter removed from the mold and allowed to cool to room temperature. In the above referred to co-pending application this process proved difficult to perform without distortion of the chamber in which the piston moves. It was discovered that the square external shape of the housing in combination with a circular bore for the piston chamber produced a structure having more material between the corners of the square and the circular chamber than existed between the sides of the square and the chamber. When the injection molded housing was allowed to cool, those areas having the lesser amounts of material cooled more quickly than did the corners. Since in the cooling process a certain amount of contraction results, the parts that cooled more quickly tended to distort the circular chamber into a more or less hour glass configuration. This provided a piston chamber which was difficult for use with a piston since leakage could occur in those areas of maximum dimension and binding could occur in those areas of minimum dimension thereby making it difficult for the piston to move properly in the chamber.

In the above referred to co-pending application the piston itself was made slightly rounded on its front surface for the purpose of allowing the air pressure in the bypass port to exert a force capable of moving the piston to its non-indicating position. It was found however that when a gaseous fluid containing certain amounts of moisture was used to move the piston said moisture tended to condense on the transparent end of the indicator housing. After a period of time enough condensation could occur to form a droplet of moisture on the transparent end so that when the piston was in contact with the transparent surface the surface tension of the moisture provided a force tending to hold the piston in the indicating position. Since the apparatus is designed to be used under very low pressure differences this additional surface tension force was sometimes sufficient to prevent the moving of the piston to its non-indicating position.

Another problem encountered arose from the method used to affix the transparent end piece to the housing. The flat surface of the transparent end cover was affixed to the housing end surface by a suitable method such as use of adhesives. Since the adhesives would not harden immediately it was necessary to provide individual clamps to hold the end cover in the proper position with respect to the housing while the adhesive dried. If this was not done the transparent end cover would frequently slip off center with respect to the housing during the hardening process. Clamping each individual unit required a great deal of apparatus.

In the indicator of the above mentioned co-pending application the bypass port for fluid pressure entered into the piston chamber by means of a lateral port molded from the main chamber to the bypass port. This provided access for air pressure to the indicating end of the housing for purposes of moving the piston to a non-indicating position. The molding process was found to leave small burrs around the edge of the hole where it joined the piston chamber which had to be removed so as to prevent obstruction of the piston.

No specific provisions for mounting the indicator unit on a facing panel were shown in the above mentioned co-pending application but with the apparatus shown the most obvious method to be used would be by screws or bolts passing through the facing into the material of the transparent end cover. The facing would of course have an aperture for viewing the piston in its indicating position. Using this method of mounting presented not only the problem of multiple operations of bolting but also provided difficulty in centering each individual indicator in the appropriate place for viewing through the aperture of the facing. An alternative method was to make the transparent end portion large enough to accommodate a plurality of indicator units and using adhesives to mount the individual housing to the same transparent end cover. This method would provide an additional problem of having to replace one of the indicators should something happen to require it.

In the above mentioned co-pending application the fluid ports are shown having a circular cross section of constant diameter. It was found that this presented a problem in attaching the fluid connections thereto. Close tolerances had to be made on the fluid connectors so that they bound within the ports of the indicator and yet could be removed when desired.

The present invention provides a design for a small compact, easily manufactured indicator unit which overcomes all of the above problems associated with the prior art indicator. Briefly these problems are overcome by shaping the outside of the housing in such a manner to approximate a circular shape with the exception of one corner where the bypass port is located. With this unique design the amount of material between the piston chamber and the exterior of the housing is kept substantially constant so as to prevent distortion upon cooling of the injection molded housing. A protuberance or standoff is provided upon the surface of the transparent end cover to prevent possible sticking if condensation moisture develops. The transparent end cover is shaped so as to fit adjacent the sides of the housing which prevents any slippage which might occur during the bonding process for the end cover. The end cover is cup shaped in such a manner that it may be properly fitted into a facing plate. Apparatus is provided in the present invention for mounting the unit with respect to the facing plate without the use of screws or bolts. The fluid ports are tapered so as to provide a quick disconnect arrangement for the fluid connectors and the mounting arrangement is such as to permit easy removal of single units from an array.

These and other features will be more readily understood upon examination of the following specification, claims, and drawings in which:

Figure 1:
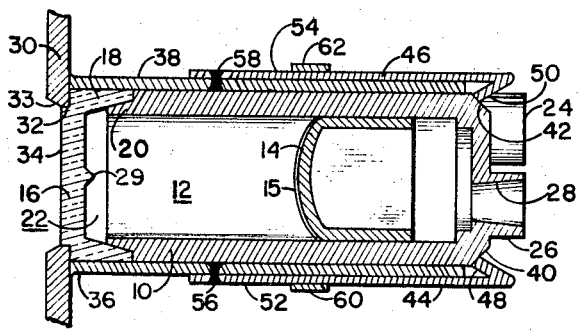
FIGURE 1 is a cross section of the present invention showing the internal parts thereof and the mounting means therefor.

Referring to FIGURE 1 a housing 10 is shown having a piston chamber 12 therein and having a piston 14 movable with the chamber 12. Piston 14 has a front surface 15 which is made of some light reflective material for easy viewing. As shown, front surface 15 may be slightly curved. In some cases, to facilitate the application of the light reflective material it may be desirable to have the front surface 15 flat. The housing 10 has a transparent end cover 16 which is cup shaped to provide a slightly tapered circumferential lip 18. The housing 10 has a tapered flange 20 thereon to accommodate the tapered lip 18 of the transparent end cover 16. The length of lip 18 is greater than that of flange 20 so that a space 22 is provided between the end of the housing 10 and the transparent end cover 16. This allows room for air or other fluid to push against piston 14 when it is in the indicating position as will be more readily seen from FIGURE 4. It is seen that the lip 18 and flange 20 fit together so that when the end cover 16 is bonded to housing 10 no lateral movement or slippage of the end cover with respect to the housing is possible.

Figure 4:
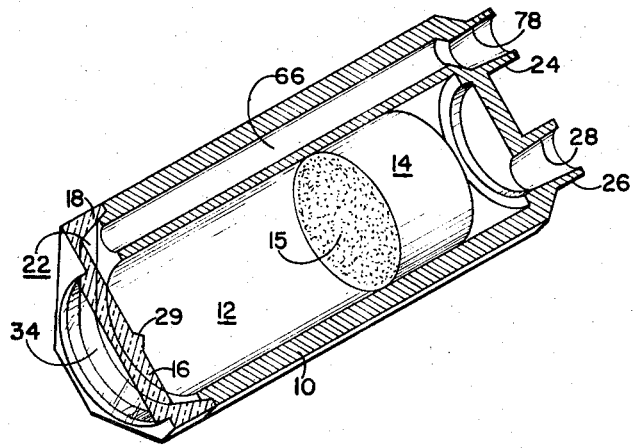
FIGURE 4 is a cross sectional oblique view of the indicator of the present invention.

Also shown in FIGURE 1 are fluid ports 24 and 26. Fluid port 24 provides a passage for air or other fluid around chamber 12 to the indicating end of the housing 10 as can be better seen in FIGURE 4. Fluid port 26 passes through the non-indicating end of the housing to the chamber 12 where pressure is operable to move the piston 14 to the indicating position adjacent end cover 16. It will be seen that the inside surface 28 of fluid port 26 is tapered so as to allow an easy disconnect arrangement as will be further described. Fluid port 24 is similarly tapered as can be seen in FIGURE 4.

Transparent end cover 16 is shown having a bump or standoff 29 thereon at approximately the center of chamber 12. The purpose of standoff 29 is to prevent piston 14 from sticking to the transparent end cover 16 should moisture form because of condensation. The standoff 29 provides a point contact with the piston 14 so that moisture forming does not adhere to both piston 14 and end cover 16 at the same time. Of course the standoff 29 could be placed upon the surface of piston 14 rather than on transparent end cover 16 and produce the same result.

In the indicating position the light reflecting material of surface 15 will be readily visible through the transparent end cover 16 and it will be immediately obvious to an observer that whatever condition caused the pressure applied to port 26 to be greater than that applied to port 24 exists. Should a pressure differential be applied to port 24 a pressure would be exerted in chamber 66 and in the space 22 between the indicating end of housing 10 and the transparent cover 16. This pressure would be applied over the surface 15 except for the point contact between surface 15 and standoff 29 and would cause piston 14 to move to the non-indicating position.

The indicator housing 10 is shown mounted to a facing plate 30 having an aperture 32 therein. The edge of aperture 32 is shown beveled to form surface 33 which may be desirable with thick facing plates. The transparent end cover 16 is constructed to have a raised portion 34 so dimensioned as to readily fit within the aperture 32 thereby positioning the indicating end of the unit with respect to the face plate.

A pair of walls 36 and 38 are shown connected to the face plate 30 and extend perpendicular thereto. Walls 36 and 38 are separated by a distance substantially the same as the dimension of the housing 10 so that housing 10 fits readily between walls 36 and 38. Housing 10 is shown to have beveled portions 40 and 42 on the non-indicating end thereof and spring members 44 and 46 are shown having first legs 48 and 50 bearing against the beveled portions 40 and 42. Spring members 44 and 46 have second legs 52 and 54 respectively which are at an acute angle with respect to legs 48 and 50. The second legs 52 and 54 are connected to the walls 36 and 38 by straps 60 and 62 and any convenient method such as rivets 56 and 58 or spot welds. The legs 52 and 54 being fastened solidly to walls 36 and 38 provide a spring arrangement such that the legs 48 and 50 must be spread apart to accommodate the insertion of the indicator housing 10. After insertion the spring members 44 and 46 move back towards each other so that the first legs 48 and 50 come to bear against the beveled portions 40 and 42 of the housing 10. By beveling the non-indicating end of the housing as at 40 and 42 it is not critical that the length of the housing 10 be exactly alike for all indicators. Since the edges are beveled the first arms 48 and 50 of spring members 44 and 46 will find a bearing point somewhere upon the beveled surface even though the length of the indicator housing 10 should be slightly longer or shorter. To remove the indicator housing 10 all that is necessary is that spring members 44 and 46 be separated from each other and the indicator unit pulled away from the facing member 30. Thus a very convenient mounting arrangement is provided for positioning the indicator units with respect to a facing plate, which mounting provides for rapid mounting and dismounting. To further simplify the removal of the indicators, one of the spring members 44 or 46 may be eliminated. For most applications a single spring member will be sufficient to hold the indicator in position. The two spring members would normally be necessary for applications where the indicator was likely to encounter excessive vibration.

In the non-indicating position the surface 15 is remote from the transparent end cover 16 and consequently is not readily visible to an observer. The internal walls of chamber 12 may also be black so as to minimize light reflection. Thus an observer will not see piston 14 through transparent end cover 16 in the non-indicating position.

Figure 2:
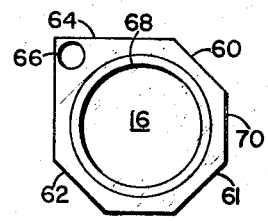
FIGURE 2 is a view taken of the indicator housing from the transparent or indicating end.

Referring now to FIGURE 2 a front view of the indicator structure is shown. It will be noted that the general shape of the indicator housing is that of a square having 3 of the corners diagonally cut off to form surfaces 60, 61, and 62. The remaining corner 64 remains square and through the transparent end cover 16 a small chamber 66 is visible. This port connects with the port 24 of FIGURE 1. It is also seen that the amount of material between the edge 68 of the aperture 12 of FIGURE 1 and the outside surface has been made substantially the same throughout. By cutting 3 corners off to provide surfaces 60, 61, and 62 the excess material in these corners has been removed and now the distance between surface 60 and the edge 68 of chamber 12 is about the same as the distance between an edge such as 70 and the edge 68 of chamber 12. The material in the corner 64 has also been effectively removed by virtue of the small chamber 66 so that the material section thickness in this corner is still about the same as that along any other edge. Thus when the apparatus is injection molded the cooling of material takes place uniformly around the entire circumference of the indicator housing and thus prevents distortion or hour-glassing of chamber 12.

Of course a circular configuration through the 3 quarters of the indicator having its corners cut off would also be satisfactory. However the approximation of the circle which is accomplished by having the roughly octagonal shape is sufficient and is preferred because of the desirability of having flat surfaces when the indicator units are to be mounted such as in FIGURE 1.

Figure 3:
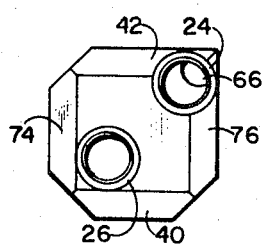
FIGURE 3 is a view of the indicator housing taken from the fluid connection or non-indicating end.

Referring now to FIGURE 3 a back view of the indicator housing is shown in which ports 24 and 26 are shown. It will be noted that the port 24 is slightly offset from small chamber 66. This occurs because of the difference in size of the openings, the port 24 being larger than the small chamber 66. The edges of port 24 should not extend beyond the edges of the housing and if small chamber 66 were co-axial with port 24 it would likely approach chamber 12 too closely. It will also be noted from FIGURE 3 that in addition to the beveled edges 40 and 42 the remaining edges 74 and 76 are beveled. This allows the indicator to be mounted between the walls 36 and 38 of FIGURE 1 in any of 4 positions. It will also be noted that port 26 is not centrally located within the outline of the housing 10 but is rather located off center and away from port 24. This permits the fluid couplings to be inserted and removed from the ports 24 and 26 easily without interference between the two.

FIGURE 4 shows an oblique cutaway view of the indicator. In FIGURE 4 the housing 10 is shown diagonally cut so as to reveal both piston chamber 12 and small chamber 66. In FIGURE 4 it can be seen that chamber 66 is located within the material from the fourth or uncut corner of the housing and passes parallel to piston chamber 12 without opening therein. The space 22 between the indicating end of housing 10 and the transparent cover 16 is also more readily apparent. It can be seen that pressure differential applied to port 26 will cause the piston 14 to move towards the transparent end cover 16. The piston will come to rest with its front surface 15 bearing against the standoff 29 on transparent end portion 16. In this position, the indicating position, the front surface 15 of piston 14 has only point contact with the transparent end cover 16. Accordingly any moisture forming because of condensation will not adhere both to the end cover 16 and surface 15. This prevents the surface tension force that might prevent smooth operation of piston 14 within chamber 12.

In FIGURE 4 it can also be seen that the port 24 has a tapered surface 78 similar to the tapered surface 28 of port 26. Furthermore the reason that port 24 is slightly offset from chamber 66 is apparent from FIGURE 4. It can be seen that if chamber 66 were co-axial with port 24 that it would in fact intersect chamber 12.

Finally FIGURE 4 shows the raised surface 34 of end cover 16 to be substantially circular. This raised portion as explained previously is made so as to fit within an aperture of a face plate for proper mounting.

Figure 5:
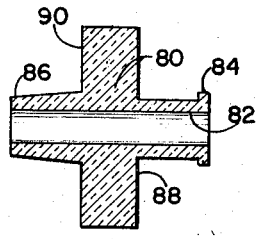
FIGURE 5 is a cross sectional view of a novel fluid connector for use with the present invention.
Figure 6:
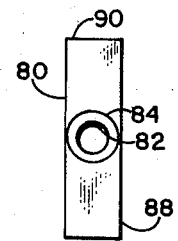
FIGURE 6 is an end view of the fluid connector for use with the present invention.

FIGURES 5 and 6 show a unique quick disconnect pneumatic connector 80. Connector 80 has a central aperture 82 to permit fluid flow therethrough. One end of connector 80 has a small annular flange 84 for purposes of connection to a flexible fluid conduit not shown. Flange 84 in operation would be forced into a fluid conduit such as plastic and would firmly bear against the interior of this conduit to prevent accidental uncoupling.

Connector 80 is also shown having a tapered end 86. The tapered portion 86 is effective to cooperate with the tapered surface 28 or 78 of ports 26 and 24. For connection the tapered portion 86 is pressed into the ports 24 and 26 until sufficient surface to surface contact results to bind the connector into the port and prevent accidental uncoupling. The dimensions of the internal surface of ports 24 and 26 and the external dimension of tapered portion 86 are not critical since it is only necessary to push the connector into the port until there is the desired binding action. The connector 80 is shown to have two laterally extending arms 88 and 90. The purpose of these arms is to provide clasping portions for the removal of the connector from the port.

Figure 7:
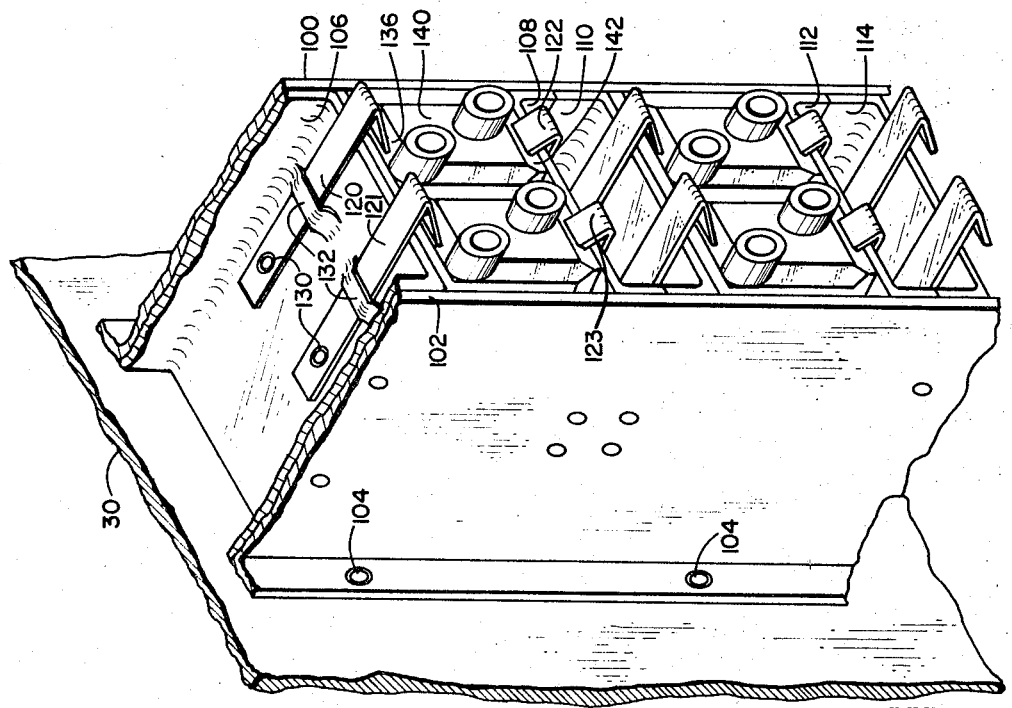
FIGURE 7 is an oblique cut away view of the apparatus of the present invention used for mounting a plurality of indicators.

In FIGURE 7 the mounting means for a plurality of indicators is shown. A cut away view of the back portion of the face plate 30 is shown in FIGURE 7 with a pair of perpendicularly extending walls 100 and 102. Walls 100 and 102 may be affixed to face plate by any convenient means such as by rivets 104. Fastened to the wall members 100 and 102 are a plurality of U-shaped walls 106, 108, 110, 112, and 114. More of these U-shaped walls may be used when it is desired to house more indicators. Attached to the flat middle portion of the U-shaped walls 106–114 are a plurality of spring members such as 120, 121, 122, and 123. These spring members are shown fastened to the flat central portion of the U-shaped wall 106 by means of rivets or spot welds 130 and straps 132. The two arms of the springs members lie at an acute angle with respect to each other with the long arm being fastened to the wall 106 and the short arm extending downwardly toward the facing member 30 so as to contact the beveled surface for example surface 136 of an indicator housing 140. Likewise the one arm of spring member 122 which is fastened to wall 108 extends downwardly to contact the beveled surface 142 of indicator housing 140. Thus spring members 120 and 122 hold indicator 140 in the mounting structure. As mentioned previously, for many applications, only one of the spring members may be necessary to properly hold each indicator in position. Furthermore, to assure that the proper contact between the spring arm and the beveled surface exists, the edge of the spring member contacting the beveled surface may be formed with two feet rather than the single edge as shown. This can be easily accomplished by cutting a U-shaped groove in the end of the spring arm.

Four indicators are shown in FIGURE 7 all of them mounted in the same manner. The flat surfaces of the indicator housings provide good contact with the walls of the mounting structure to prevent rotation. It will be seen that each individual indicator may be removed separately merely by bending its associated springs out from each other and by pulling on the housing. Thus removal and replacement of an indicator is facilitated when repair is necessary.

Figure 8:
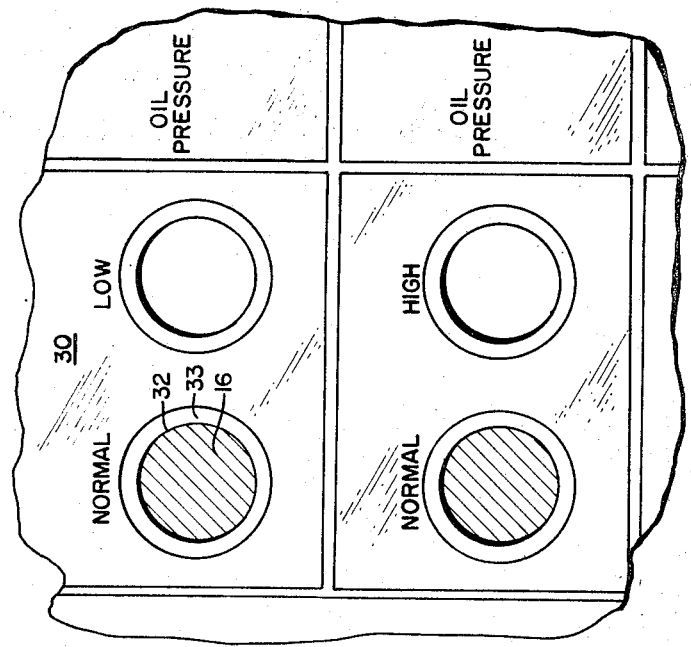
FIGURE 8 is a front view of a facing plate through which the individual indicators are visible.

In FIGURE 8 a partial front view of the facing 30 is shown. It will be seen that the aperture 32 with its beveled surface 33 provides a view of the transparent end cover 16. Through this aperture the piston 14 with its light reflecting surface 15 is visible under the condition identified as "normal," while the surface 15 of other indicators are not visible. Thus from FIGURE 8 the operator will quickly be able to determine that both oil pressures are normal.

Should it occur that the oil pressure which is being indicated in FIGURE 8 drops to a low value the source of pressure applied to the indicators would change so that the indicator piston associated with the low reading would move forward and that associated with the normal reading would recede. This would then alert the operator to the fact of low oil pressure. The use of oil pressure in FIGURE 8 is only an example and it will be obvious that the present indicators may be used to indicate changes of any condition which can be converted to a fluid pressure differential.

It is thus seen that the present invention has provided a simple, easily constructed, light weight indicator for use single or in multiples. The problems encountered in the prior art have been shown to be overcome with the present invention and a unique and easily useable mounting means for the indicators as well as novel pressure connectors has been shown. It will be obvious to those skilled in the art that many modifications and changes could be made to the apparatus shown in this preferred embodiment without departing from the spirit of the invention. I therefore do not intend to be limited by the specific disclosures used in connection with the preferred embodiment but rather intend to be limited only by the following claims:

What is claimed is:

1. A housing comprising a block of material having:
   a first end surface;
   a second end surface;
   a first chamber in said housing extending along an axis from the first end surface toward the second end surface;
   a second chamber in said housing extending from the first end surface parallel to the axis and displaced from the first chamber; and
   a cross sectional shape which is as a square with three corners removed to at least approximate a circle substantially concentric with the first chamber, the second chamber being located in the remaining square corner, the quantity of material between the first chamber and the exterior of the housing being generally uniform as measured radially about the axis to permit construction of the housing from a molten material and provide minimum distortion when cooled.

2. Apparatus according to claim 1 wherein the housing is a portion of an indicator and including a transparent cover mounted at the first end surface and a piston in the first chamber movable to a first position adjacent the cover where it is clearly visible therethrough and to a second position remote from the cover where it is less clearly visible therethrough.

3. Apparatus according to claim 2 wherein the second end surface has a first fluid port therethrough connecting to the first chamber and a second fluid port therethrough connecting to the second chamber and said transparent cover is mounted at the first end surface so that fluid passage between the first and second chambers is provided between the cover and the first end surface, pressure applied to the first port greater than that applied to the second port causing the piston to move to the first position, pressure applied to the second port greater than that applied to the first port causing the piston to move to the second position.

4. Apparatus according to claim 2 wherein standoff means are provided between the piston and the cover to prevent surface to surface contact.

5. Apparatus according to claim 3 wherein the first fluid port and the second fluid port are tapered through the second end surface and including first and second fluid connector means each having a tapered tube cooperating with a respective tapered port.

6. Apparatus of the class described comprising, in combination:
   an indicator including a housing having a transparent first end, a second end with a beveled portion thereon and having a predetermined transverse dimension;
   a facing member having an aperture therein;
   a first wall mounted perpendicular to said facing member and proximate to the aperture;
   a second wall mounted perpendicular to said facing member, proximate the aperture and spaced from said first wall by an amount substatnilly equal to the dimension;
   said walls effective to receive the housing of said indicator therebetween with the transparent first end proximate the aperture in said facing member; and
   spring means having two legs at an acute angle, a first of said legs fastened to one of the walls and the other of said legs bearing against the beveled portion of the second end to hold said indicator with respect to said facing member.

7. Apparatus according to claim 6 wherein said transparent end has a raised portion thereon effective to fit in the aperture of said facing member; and
   second spring means are provided having a first leg fastened to said second wall and a second leg at an acute angle to said first leg bearing upon the beveled portion of the second end of the housing of said indicator.

References Cited

UNITED STATES PATENTS

| 1,400,477 | 12/1921 | Curtis | 92—170 |
| 2,478,106 | 8/1949 | Jozif | 123—41.69 |

FOREIGN PATENTS

| 1,174,659 | 6/1962 | Germany. |

RICHARD B. WILKINSON, *Primary Examiner.*

S. A. WAL, *Assistant Examiner.*